(12) United States Patent
Ogden, Jr.

(10) Patent No.: US 9,457,547 B2
(45) Date of Patent: Oct. 4, 2016

(54) EXTRUDABLE ADHERABLE MATERIAL SYSTEMS

(75) Inventor: Orval D. Ogden, Jr., Marietta, OH (US)

(73) Assignee: Magnum Magnetics Corporation, Marietta, OH (US)

( * ) Notice: Subject to any disclaimer, the term of this patent is extended or adjusted under 35 U.S.C. 154(b) by 411 days.

(21) Appl. No.: 12/263,334

(22) Filed: Oct. 31, 2008

(65) Prior Publication Data

US 2009/0117309 A1    May 7, 2009

Related U.S. Application Data

(60) Provisional application No. 60/986,222, filed on Nov. 7, 2007.

(51) Int. Cl.
| | | |
|---|---|---|
| *B32B 5/14* | (2006.01) | |
| *B32B 7/06* | (2006.01) | |

(Continued)

(52) U.S. Cl.
CPC ....... *B32B 37/1284* (2013.01); *B29C 47/0064* (2013.01); *B29C 47/8815* (2013.01); *B32B 7/06* (2013.01); *B32B 7/12* (2013.01); *B32B 25/14* (2013.01); *B32B 27/08* (2013.01); *B32B 37/203* (2013.01); *B41M 1/30* (2013.01); *C09J 7/021* (2013.01); *B29C 47/025* (2013.01); *B29C 47/8845* (2013.01); *B32B 5/147* (2013.01); *B32B 25/04* (2013.01); *B32B 37/08* (2013.01); *B32B 37/153* (2013.01); *B32B 38/0004* (2013.01); *B32B 38/145* (2013.01); *B32B 2037/1215* (2013.01); *B32B 2250/03* (2013.01); *B32B 2307/748* (2013.01); *B32B 2307/75* (2013.01); *B32B 2307/756* (2013.01); *B32B 2309/02* (2013.01); *B32B 2309/10* (2013.01); *B32B 2309/105* (2013.01); *B32B 2309/14* (2013.01); *C09J 7/0221* (2013.01); *C09J 7/0225* (2013.01); *C09J 7/0239* (2013.01); *C09J 9/00* (2013.01); *C09J 153/02* (2013.01); *C09J 2423/00* (2013.01); *C09J 2425/00* (2013.01); *Y10S 428/906* (2013.01); *Y10T 428/1476* (2015.01)

(58) Field of Classification Search
None
See application file for complete search history.

(56) References Cited

U.S. PATENT DOCUMENTS 2,156,380 A    5/1939  Drew
2,459,891 A *  1/1949  Nelson et al. ............... 524/490
(Continued)

FOREIGN PATENT DOCUMENTS

EP    1331092 A2    7/2003
EP    1505137 A1    2/2005
(Continued)

OTHER PUBLICATIONS

A.J. Kinloch, Adhesion and adhesives: science and technology, 1987 (no month), Springer, p. 303.*
(Continued)

*Primary Examiner* — Jeff Vonch
(74) *Attorney, Agent, or Firm* — Vorys, Sater, Seymour and Pease LLP; William L. Klima; Vincent M DeLuca

(57) ABSTRACT

Manufacturing methods and systems providing continuous rolls of polyvinyl materials printable on one side and "sticky"-adherable on the other side. Such continuous rolls may be thereafter cut into sizes appropriate for signs, bumper stickers, and other information and/or design objects which are affixable to appropriate surfaces for a variety of advertising and/or design uses.

14 Claims, 5 Drawing Sheets

(51) Int. Cl.

| | | |
|---|---|---|
| B32B 7/12 | (2006.01) | |
| B32B 27/00 | (2006.01) | |
| B32B 37/08 | (2006.01) | |
| B32B 37/15 | (2006.01) | |
| C09J 7/02 | (2006.01) | |
| C09J 153/02 | (2006.01) | |
| B29C 47/02 | (2006.01) | |
| B29C 47/88 | (2006.01) | |
| B32B 27/08 | (2006.01) | |
| B32B 25/14 | (2006.01) | |
| B32B 37/12 | (2006.01) | |
| B29C 47/00 | (2006.01) | |
| B32B 37/20 | (2006.01) | |
| B41M 1/30 | (2006.01) | |
| B32B 25/04 | (2006.01) | |
| C09J 9/00 | (2006.01) | |
| B32B 38/00 | (2006.01) | |

(56) References Cited

U.S. PATENT DOCUMENTS

| | | | |
|---|---|---|---|
| 3,089,786 A * | 5/1963 | Nachtsheim | C09J 7/0278 116/DIG. 14 |
| 3,392,076 A * | 7/1968 | van Gilse van der pals | B05D 1/265 156/244.23 |
| 3,592,710 A * | 7/1971 | Yurgen et al. | 156/153 |
| 3,648,835 A * | 3/1972 | Yucel | 428/156 |
| 3,783,072 A * | 1/1974 | Korpman | B05D 1/265 156/244.23 |
| 3,935,338 A * | 1/1976 | Robertson | C09J 109/00 427/208.4 |
| 3,984,509 A * | 10/1976 | Hall | B29C 47/00 156/244.27 |
| 4,339,485 A * | 7/1982 | Shibano | C09J 7/046 156/289 |
| 4,379,806 A * | 4/1983 | Korpman | C09J 7/0264 156/244.11 |
| 4,388,349 A * | 6/1983 | Korpman | B05C 5/0254 427/208.4 |
| 4,629,648 A | 12/1986 | Minick et al. | |
| 4,735,837 A | 4/1988 | Miyasaka et al. | |
| 4,833,193 A * | 5/1989 | Sieverding | C09J 7/00 428/220 |
| 5,047,196 A * | 9/1991 | Zuckerberg et al. | 264/173.14 |
| 5,187,007 A | 2/1993 | Ebe et al. | |
| 5,639,539 A * | 6/1997 | DeProspero | B44C 5/0461 156/244.16 |
| 5,795,636 A | 8/1998 | Keller et al. | |
| 5,906,889 A * | 5/1999 | Miron | 428/323 |
| 5,919,562 A * | 7/1999 | Root | 428/343 |
| 6,433,069 B1 * | 8/2002 | Oeltjen et al. | 524/505 |
| 6,461,555 B1 | 10/2002 | Freedman | |
| 6,984,413 B2 | 1/2006 | Yamamoto et al. | |
| 7,175,898 B2 | 2/2007 | Luhmann et al. | |
| 7,246,961 B2 | 7/2007 | Gilmour | |
| 2001/0030020 A1 | 10/2001 | Nandy et al. | |
| 2005/0031822 A1 | 2/2005 | Aihara et al. | |
| 2005/0074549 A1 | 4/2005 | Su et al. | |
| 2006/0093775 A1 * | 5/2006 | Konig | B65H 19/102 428/40.1 |
| 2006/0194042 A1 * | 8/2006 | De Carolis | B32B 27/08 428/354 |
| 2006/0251889 A1 * | 11/2006 | Lane et al. | 428/343 |
| 2006/0251890 A1 * | 11/2006 | Lane | C09J 7/0246 428/343 |
| 2007/0231571 A1 * | 10/2007 | Lane | B29C 47/0021 428/354 |
| 2008/0226905 A1 * | 9/2008 | Dollase et al. | 428/343 |

FOREIGN PATENT DOCUMENTS

| | | | | |
|---|---|---|---|---|
| JP | 55034249 A | * | 3/1980 | |
| JP | 58113283 A | * | 7/1983 | C09J 7/02 |
| JP | 59122570 A | * | 7/1984 | |
| JP | 04227781 A | * | 8/1992 | |
| JP | 06122858 A | * | 5/1994 | |
| JP | 07011208 A | * | 1/1995 | |
| JP | 11116914 A | * | 4/1999 | |
| JP | 11116915 A | * | 4/1999 | |
| JP | 11228923 A | * | 8/1999 | |
| JP | 2002370328 A | | 12/2002 | |
| KR | 20060091110 A | | 8/2006 | |
| WO | WO 93/17079 A1 | | 9/1993 | |
| WO | WO 0013888 A1 | * | 3/2000 | |
| WO | WO2007023843 A1 | | 3/2007 | |
| WO | WO 2007054455 A1 | * | 5/2007 | |

OTHER PUBLICATIONS

Kraton, Kraton Announces New Styrenic Block Copolymers (SBC) for Enhanced Flow, Improved Transparency, and Superior Surface Appearance, Apr. 2006.*
English Translation of JP 58113283 A, Jul. 1983.*
English Abstract for JP 55034249 A, Mar. 1980.*

* cited by examiner

EXTRUDABLE ADHERABLE MATERIAL SYSTEMS

CROSS REFERENCE TO RELATED APPLICATION

The present application is related to and claims priority from prior provisional application Ser. No. 60/986,222, filed Nov. 7, 2007, entitled "EXTRUDABLE ADHERABLE MATERIAL SYSTEMS", the contents of which are incorporated herein by this reference and are not admitted to be prior art with respect to the present invention by the mention in this cross-reference section.

BACKGROUND

This invention relates to extrudable adherable material systems. More particularly, this invention relates to providing a system for improved manufacturing of adherable materials. More particularly, it relates to continuously manufacturing a printable material roll, all or portions of which may be adhered to a surface, particularly for viewing of the printing.

If certain products can be adapted to "mass" and/or "continuous" manufacturing, such adaptations may assist in overcoming problems, especially in terms of cost and expense, which might otherwise be incurred using "batch" techniques or even one-product-at-a-time techniques. There are such problems in manufacturing printed materials capable of being "stuck" or otherwise affixed to surfaces proper for a variety of advertising and/or design uses.

OBJECTS AND FEATURES OF THE INVENTION

A primary object and feature of the present invention is to provide a system overcoming the above-mentioned problems.

It is a further object and feature of the present invention to provide such a system which provides, in the form of a continuous roll, a useful adherable material which might otherwise be available only in batch form, more expensive and time consuming to manufacture.

A further object and feature of this invention is to provide manufacturing of such a continuous roll having essentially one printable side and one "sticky" side so that all or portions of such roll may be appropriately printed and adhered to surfaces proper for a variety of advertising and/or design uses.

Still another object and feature of this invention is to provide methods and systems relating to manufacture and use of such continuous rolls in highly efficient and novel ways.

A further primary object and feature of the present invention is to provide such a system that is cost effective, adaptable, and useful in many ways. Other objects and features of this invention will become apparent with reference to the following descriptions.

SUMMARY OF THE INVENTION

In accordance with a preferred embodiment hereof, this invention provides a method of manufacture comprising the steps of: providing at least one meltable supply of at least one thermoplastic adhesive material; melting such at least one meltable supply in at least one heated chamber to provide at least one melted supply of such at least one thermoplastic material; and providing at least one continuous supply of at least one printable material having a "wide width"; wherein at least one first side of such at least one continuous supply of such printable material is capable of forming at least one thermoplastic bond with such at least one thermoplastic adhesive material; and continuously hot-extruding such at least one melted supply of such at least one thermoplastic adhesive material onto such at least one first side of such at least one continuous supply of such printable material to provide at least one hot extruded adhesive layer; wherein at least one hot contact area, between at least one first side of such at least one hot extruded adhesive layer and such at least one first side of such at least one continuous supply of such printable material, forms at least one "strong" thermoplastic bond; wherein at least one "wide-width" continuous layered roll may be manufactured in at least one continuous process; and wherein such "wide width" comprises no less than about one foot to about three feet.

Moreover, it provides such a method further comprising the steps of: cooling such at least one hot extruded adhesive layer during such at least one continuous process to provide at least one cooled extruded adhesive layer; continuously applying at least one continuous release-sheet layer upon at least one second side of such at least one cooled extruded adhesive layer; and continuously forming at least one "weak" contact bond between such at least one continuous release-sheet layer and such at least one second side of such at least one cooled extruded adhesive layer; wherein such at least one "wide-width" continuous layered roll further comprises such at least one continuous release-sheet layer.

Additionally, it provides such a method further comprising the step of printing such at least one printable side of such at least one "wide-width" continuous layered roll. Also, it provides such a method further comprising, as a final step, the step of cutting such at least one "wide-width" continuous layered roll; wherein a plurality of adherable printed displays may be obtained.

In addition, it provides such a method wherein such at least one thermoplastic adhesive material comprises at least one copolymer. And, it provides such a method wherein such at least one copolymer comprises at least one styrene-ethylene/butylene-styrene polymer. Further, it provides such a method wherein such at least one styrene-ethylene/butylene-styrene polymer comprises about 34% polystyrene. Even further, it provides such a method wherein such at least one styrene-ethylene/butylene-styrene polymer comprising about 34% polystyrene comprises a material described in the art and marketed as "Kraton G1641H".

Moreover, it provides such a method wherein such at least one second side of such at least one cooled extruded adhesive layer is capable of forming, releasing from, and re-forming contact bonds with additional surfaces than surfaces comprising release-sheet layers. Additionally, it provides such a method wherein such at least one second side of such at least one cooled extruded adhesive layer, when loss of capability of re-forming contact bonds due to soiling occurs, is capable of being restored by cleaning.

Also, it provides such a method wherein such at least one second side of such at least one cooled extruded adhesive layer when releasing from such additional surfaces causes no substantial damage to such additional surfaces. In addition, it provides such a method wherein such at least one second side of such at least one cooled extruded adhesive layer when releasing from such additional surfaces leaves no substantial residue on such additional surfaces.

And, it provides such a method wherein such "wide width" comprises from about 1½ feet to about 2 feet.

Further, it provides such a method wherein such at least one "wide-width" continuous layered roll comprises a maximum length of about 500 feet. Even further, it provides such a method wherein at least one thickness of such at least one cooled extruded adhesive layer comprises between about 20 mils and about 30 mils.

Moreover, it provides such a method wherein such step of melting comprises heating such at least one meltable supply to at least one temperature of from about 250 degrees Fahrenheit to about 350 degrees Fahrenheit. Additionally, it provides such a method wherein such step of cooling comprises providing at least one cooling roller in contact with such at least one continuous supply of printable material; and wherein such at least one cooling roller is placed generally between at least one place of extrusion and at least one place of application of such release-sheet layer. Also, it provides such a method wherein at least one distance between such at least one place of extrusion and such at least one place of application of such release-sheet layer comprises about two feet.

In addition, it provides such a method wherein such continuous supply of printable material comprises polyvinyl. And, it provides such a method wherein at least one thickness of such polyvinyl comprises from about two mils to about three mils.

In accordance with another preferred embodiment hereof, this invention provides at least one product manufactured by at least one method.

Further, it provides such a method further comprising, as a preliminary step, the step of printing such at least one printable side of such at least one continuous supply.

In accordance with another preferred embodiment hereof, this invention provides a roll system, relating to adherable material, comprising: at least one printable material, in at least one continuous length, having a "wide width"; at least one thermoplastic adhesive material overlaying such at least one printable material; wherein at least one contact area between such at least one printable material and at least one first side of such at least one thermoplastic adhesive material forms at least one "strong" thermoplastic bond; wherein such overlaid such at least one printable material comprises at least one "long" integral roll; and wherein such "wide width" comprises no less than about one foot to about three feet.

Even further, it provides such a roll system further comprising: at least one release-sheet material, in at least one continuous length, overlaying at least one second side of such at least one thermoplastic adhesive material, wherein at least one contact area between such at least one release-sheet material and such at least one second side of such at least one thermoplastic adhesive material forms at least one "weak" contact bond.

Moreover, it provides such a roll system wherein such at least one thermoplastic adhesive material comprises at least one copolymer. Additionally, it provides such a roll system wherein such at least one copolymer comprises at least one styrene-ethylene/butylene-styrene polymer. Also, it provides such a roll system wherein such at least one styrene-ethylene/butylene-styrene polymer comprises about 34% polystyrene. In addition, it provides such a roll system wherein such at least one styrene-ethylene/butylene-styrene polymer comprising about 34% polystyrene comprises a material described in the art and marketed as "Kraton G1641H".

And, it provides such a roll system wherein such at least one second side of such at least one thermoplastic adhesive material is capable of forming, releasing from, and re-forming contact bonds with additional surfaces other than surfaces comprising release-sheet layers. Further, it provides such a roll system wherein such at least one second side of such at least one thermoplastic adhesive material, when loss of capability of re-forming contact bonds due to soiling occurs, is capable of being restored by cleaning.

Even further, it provides such a roll system wherein such at least one second side of such at least one thermoplastic adhesive material when releasing from such additional surfaces causes no substantial damage to such additional surfaces. Even further, it provides such a roll system wherein such at least one second side of such at least one thermoplastic adhesive material when releasing from such additional surfaces leaves no substantial residue on such additional surfaces.

Even further, it provides such a roll system wherein such "wide width" comprises from about 1-½ feet to about 2 feet. Even further, it provides such a roll system wherein such at least one "wide width" continuous layered roll comprises a maximum length of about 500 feet. Even further, it provides such a roll system wherein at least one thickness of such at least one thermoplastic adhesive material comprises between about 20 mils and about 30 mils. Even further, it provides such a roll system wherein such at least one printable material comprises polyvinyl. Even further, it provides such a roll system wherein at least one thickness of such polyvinyl comprises from about two mils to about three mils. And, it provides for each and every novel feature, element, combination, step and/or method disclosed or suggested by this provisional patent application.

DETAILED DESCRIPTION OF THE BEST MODES AND PREFERRED EMBODIMENTS OF THE INVENTION

Figure 1:
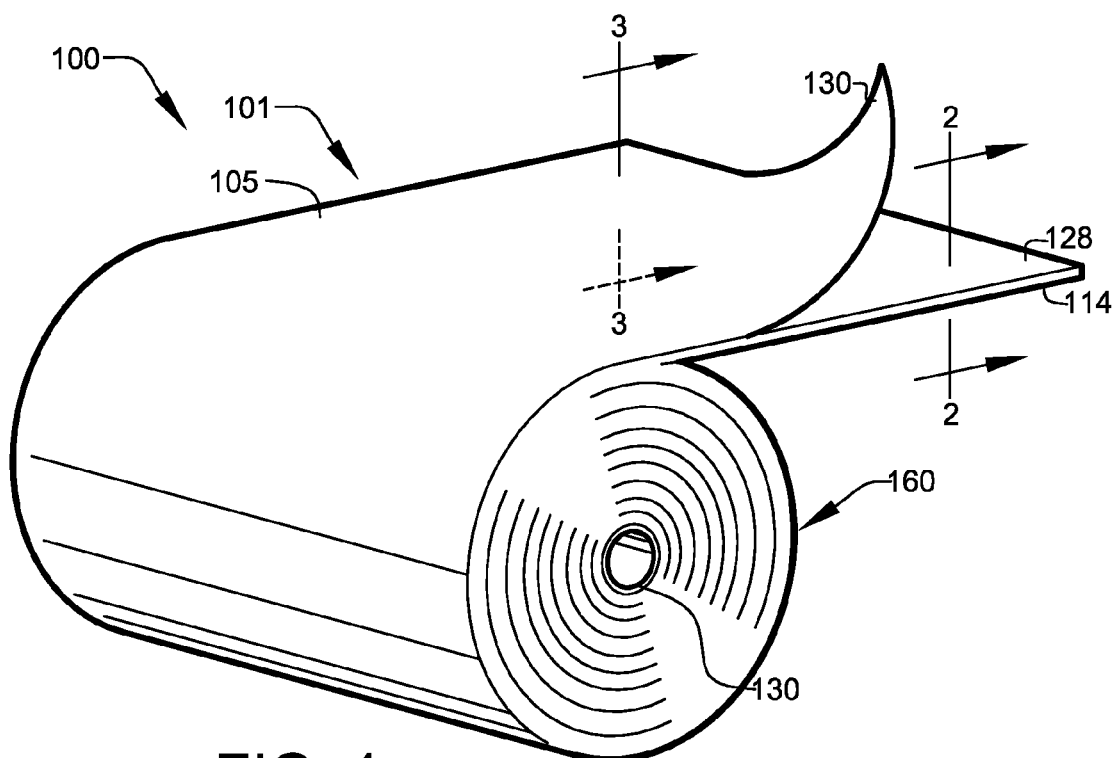
FIG. 1 shows a perspective view, illustrating a continuous roll of an adherable material of an extrudable adherable material system, according to a preferred embodiment of the present invention.

FIG. 1 shows a perspective view, illustrating at least one continuous roll 160 of at least one adherable material 105 of an extrudable adherable material system 100, according to a preferred embodiment of the present invention. In embodiment 101 of extrudable adherable material system 100, adherable material 105 preferably wraps continuously around at least one core 165, as shown, of between about 3 inches and about 6 inches in diameter, forming continuous roll 160. Continuous roll 160 (at least embodying herein wherein such "wide width" comprises no less than about one foot to about three feet; and at least embodying herein wherein such "wide width" comprises from about 1-½ feet to about 2 feet; and at least embodying herein wherein such at least one "wide-width" continuous layered roll comprises a maximum length of about 500 feet) is preferably between about 1 foot and 3 feet wide, preferably between about 1½ feet and 2 feet wide, preferably about 1½ feet wide and preferably no more than about 500 feet long (for optimal handling), as shown. Adherable material 105 preferably comprises at least one printable side 114 and at least one contact adhesive side 128. Adherable material 105 further comprises at least one release-sheet layer 130. Release-sheet layer 130 overlays contact adhesive side 128. Release-sheet layer 130 preferably protects contact adhesive side 128, as shown, maintaining quality of contact adhesive side 128 prior to use of adherable material 105. To use adherable material 105, release-sheet layer 130 preferably peals off to expose contact adhesive side 128, as shown.

Figure 2:
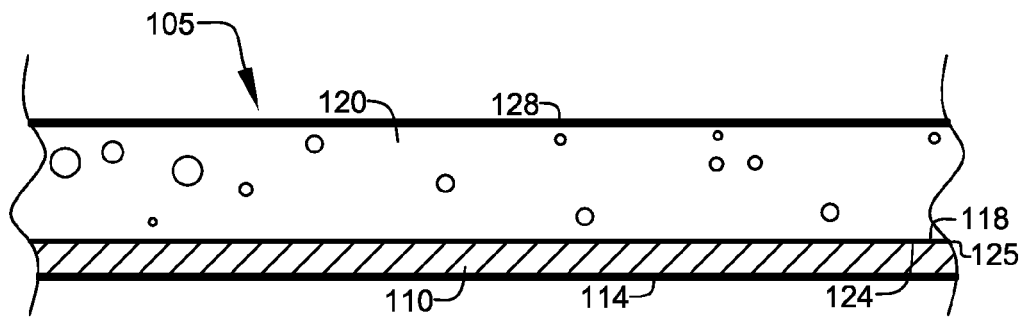
FIG. 2 shows a sectional side view through section 2-2, illustrating an adherable material of the extrudable adherable material system, according to the preferred embodiment of FIG. 1.

FIG. 2 shows a sectional side view through section 2-2, illustrating adherable material 105 of extrudable adherable material system 100, according to embodiment 101 of FIG. 1. Adherable material 105 preferably comprises at least one printable layer 110 and at least one adhesive layer 120, as shown. Printable layer 110 preferably comprises printable side 114 and at least one bondable side 118, as shown. Printable layer 110 (at least embodying herein wherein at least one thickness of such polyvinyl comprises from about two mils to about three mils) preferably is between about 2 mils and about 3 mils thick. Printable layer 110 preferably is as wide as continuous roll 160 (at least embodying herein at least one printable material, in at least one continuous length, having a "wide width").

Printable layer 110 (at least embodying herein wherein such continuous supply of printable material comprises polyvinyl) preferably comprises at least one polymer-based compound. Such polymer-based compound preferably comprises at least one polyvinyl material. Upon reading this specification, those with skill in the art will now appreciate that, under appropriate circumstances, considering such issues as then cost, future technology, newly developed materials, etc., use of other materials, such as those, for example, comprising other plastics, plastics lacking polyvinyl, non-plastic printable materials with bonding properties, etc., may suffice.

Printable layer 110 preferably may be cleaned when soiled, preferably using water. Alternately, printable layer 110 may preferably be cleaned using household cleaning agents, preferably comprising glass cleaners, alternately preferably soap, alternately preferably surface spray cleaners.

Adhesive layer 120 preferably comprises at least one thermoplastic hot melt adhesive 210 (at least embodying herein wherein such at least one thermoplastic adhesive material comprises at least one copolymer; and at least embodying herein wherein such at least one copolymer comprises at least one styrene-ethylene/butylene-styrene polymer; and at least embodying herein wherein such at least one styrene-ethylene/butylene-styrene polymer comprises about 34% polystyrene; and at least embodying herein wherein such at least one styrene-ethylene/butylene-styrene polymer comprising about 34% polystyrene comprises a material described in the art and marketed as "Kraton G1641H"), preferably at least one copolymer, preferably at least one copolymer based on styrene, ethylene and butylenes, preferably such copolymer known as "Kraton G1641H" (available from Kraton Polymers of North America). "Kraton G1641H" is composed of styrene-ethylene/butylene-styrene polymer comprising about 34% polystyrene. Upon reading this specification, those with skill in the art will now appreciate that, under appropriate circumstances, considering such issues as then cost, future technology, newly developed materials, etc., use of other thermoplastic hot melt adhesives such as those, for example, comprising other plastics, plastics lacking polystyrene, non-plastic materials with thermoplastic properties, etc., may suffice.

Adhesive layer 120 preferably comprises at least one primary bond side 124, as shown. Primary bond side 124 preferably bonds to bondable side 118 of printable layer 110, forming at least one primary bond 125, as shown. Adhesive layer 120 preferably further comprises contact adhesive side 128. Adhesive layer 120 (at least embodying herein wherein at least one thickness of such at least one cooled extruded adhesive layer comprises between about 20 mils and about 30 mils) preferably is between about 20 mils and about 30 mils thick, as shown. Adhesive layer 120 and printable layer 110 are preferably flexible enough so as to allow adherable material 105 to be rolled into continuous roll 160, as shown in FIG. 1.

Figure 3:
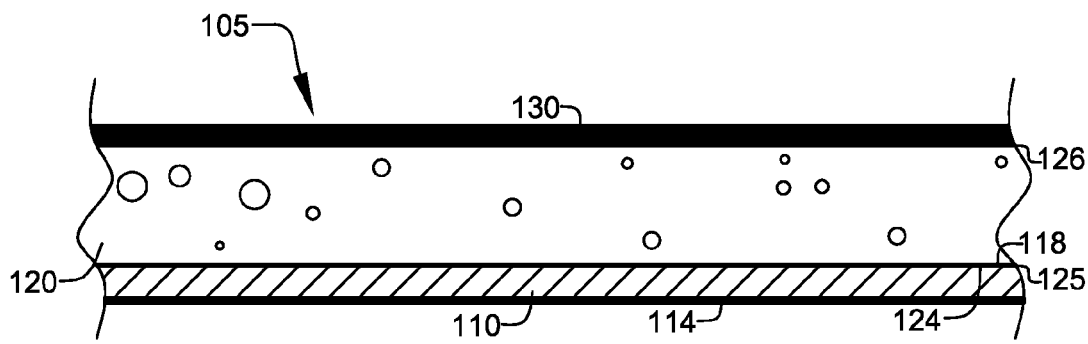
FIG. 3 shows a sectional side view through section 3-3, illustrating an adherable material with a release-sheet layer of an extrudable adherable material system, according to the preferred embodiment of FIG. 1.

FIG. 3 shows a sectional side view through section 3-3, illustrating adherable material 105 with at least one release-sheet layer 130 of extrudable adherable material system 100, according to embodiment 101 of FIG. 1. Adherable material 105 preferably further comprises release-sheet layer 130. Contact adhesive side 128 may form at least one contact bond 126. Prior to initial use, contact adhesive side 128 preferably adheres to release-sheet layer 130, as shown, using contact bond 126 (at least embodying herein wherein at least one contact area between such at least one release-sheet material and such at least one second side of such at least one thermoplastic adhesive material forms at least one "weak" contact bond). Release-sheet layer 130 preferably comprises at least one polymer, alternately preferably at least one polymer coated paper. Release-sheet layer 130 is preferably designed to minimize adhesion to contact adhesive side 128 of adherable material 105 to enable removal of release-sheet layer 130 (at least embodying herein at least one release-sheet material, in at least one continuous length, overlaying at least one second side of such at least one thermoplastic adhesive material).

Figure 4:
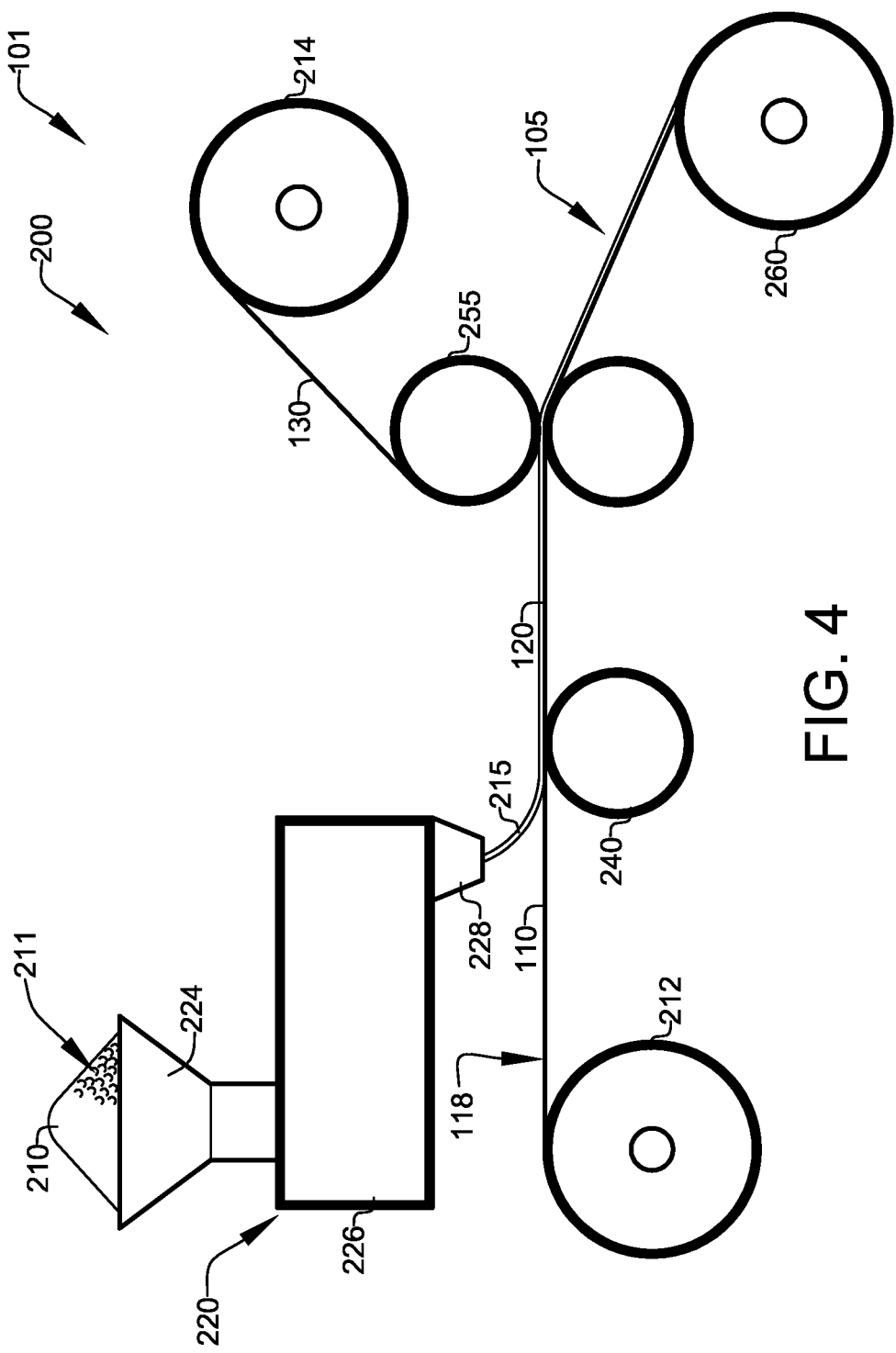
FIG. 4 shows a side diagrammatical view of a manufacturing process, illustrating manufacture of a continuous roll of an adherable material, of an extrudable adherable material system according to the preferred embodiment of FIG. 1.

FIG. 4 shows a side diagrammatical view of a manufacturing process 200, illustrating manufacture of continuous roll 160 of adherable material 105, of extrudable adherable material system 100 according to preferred embodiment 101 of FIG. 1. Printable layer 110 is preferably provided in at least one printable layer continuous roll 212 for manufacturing of adherable material 105, as shown. Adherable material 105 is manufactured with printable side 114 preferably blank, as shown, or alternately preferably pre-printed, not shown. Release-sheet layer 130 is preferably provided in at least one release-sheet layer continuous roll 214 for manufacturing of adherable material 105, as shown. As shown, thermoplastic hot melt adhesive 210 is provided, preferably in pellets 211, alternately preferably in at least one powder, for manufacturing of adherable material 105.

Thermoplastic hot melt adhesive 210 is preferably placed into hopper 224 of an extruder 220, as shown. Thermoplastic hot melt adhesive 210 preferably transfers from hopper 224 to at least one melting chamber 226 (at least embodying herein wherein such step of melting comprises heating such at least one meltable supply to at least one temperature of from about 250 degrees Fahrenheit to about 350 degrees Fahrenheit) and preferably heats to between about 250 degrees Fahrenheit and about 350 degrees Fahrenheit. Thermoplastic hot melt adhesive 210 preferably mixes in melting chamber 226, to assure even temperature and consistency. As thermoplastic hot melt adhesive 210 melts at least one hot melted adhesive 215 is preferably formed.

At least one extrusion die 228 preferably charges with hot melted adhesive 215, as shown. Printable layer 110 preferably unrolls from printable layer continuous roll 212 and preferably feeds under extrusion die 228, as shown. Clearance between printable layer 110 and extrusion die 228 preferably is between about 20 mils and about 30 mils. Hot melted adhesive 215 preferably extrudes from extrusion die 228 onto bondable side 118 of printable layer 110, as shown. Hot melted adhesive 215 preferably is between about 20 mils and about 30 mils thick when extruded.

Heat from hot melted adhesive 215 preferably causes at least one thermoplastic bond to form between hot melted adhesive 215 and bondable side 118 (at least embodying herein wherein at least one first side of such at least one continuous supply of such printable material is capable of forming at least one thermoplastic bond with such at least one thermoplastic adhesive material) of printable layer 110, as shown. Primary bond 125 (at least embodying herein wherein at least one hot contact area, between at least one first side of such at least one hot extruded adhesive layer and such at least one first side of such at least one continuous supply of such printable material, forms at least one "strong" thermoplastic bond) preferably comprises such at least one thermoplastic bond. Hot melted adhesive 215 and printable layer 110 preferably cool on at least one cooler roll 240, as shown. Cooler roll 240 preferably maintains a temperature of between about 60 degrees Fahrenheit and about 75 degrees Fahrenheit, as shown. As hot melted adhesive 215 cools, adhesive layer 120 (at least embodying herein at least one thermoplastic adhesive material overlaying such at least one continuous supply of at least one printable material) preferably forms, as shown.

Release-sheet layer 130 preferably unrolls from release-sheet layer continuous roll 214 and preferably feeds onto at least one application roller 255, as shown. Cooler roll 240 is preferably between extrusion die 228 and application roller 255 (this arrangement at least embodying herein wherein such at least one cooling roller is placed generally between at least one place of extrusion and at least one place of application of such release-sheet layer). Application roller 255 preferably applies release-sheet layer 130 to adhesive layer 120, as shown. To allow for cooling time, separation of extrusion die 228 and application roller 255 preferably is about 2 feet (this arrangement at least embodying herein wherein at least one distance between such at least one place of extrusion and such at least one place of application of such release-sheet layer comprises about two feet). When cooled, temperature of adhesive layer 120 preferably is insufficient to form a thermoplastic bond, however, contact bond 126 preferably forms comprising at least one "weak" contact bond. Pressure of application roller 255 preferably engages contact bond 126 between contact adhesive side 128 and release-sheet layer 130 (at least embodying herein wherein such at least one "wide-width" continuous layered roll further comprises such at least one continuous release-sheet layer; and this arrangement at least embodying herein continuously forming at least one "weak" contact bond between such at least one continuous release-sheet layer and such at least one second side of such at least one cooled extruded adhesive layer).

At least one take-up roll preferably gathers completed adherable material 105 into continuous roll 160, as shown. When continuous roll 160 reaches full length, adherable material 105 is preferably cut and continuous roll 160 is preferably stored for later use. Manufacturing process 200 preferably runs at a rate of about 150 feet per minute. This arrangement at least embodies herein wherein at least one "wide-width" continuous layered roll may be manufactured in at least one continuous process.

Figure 5:
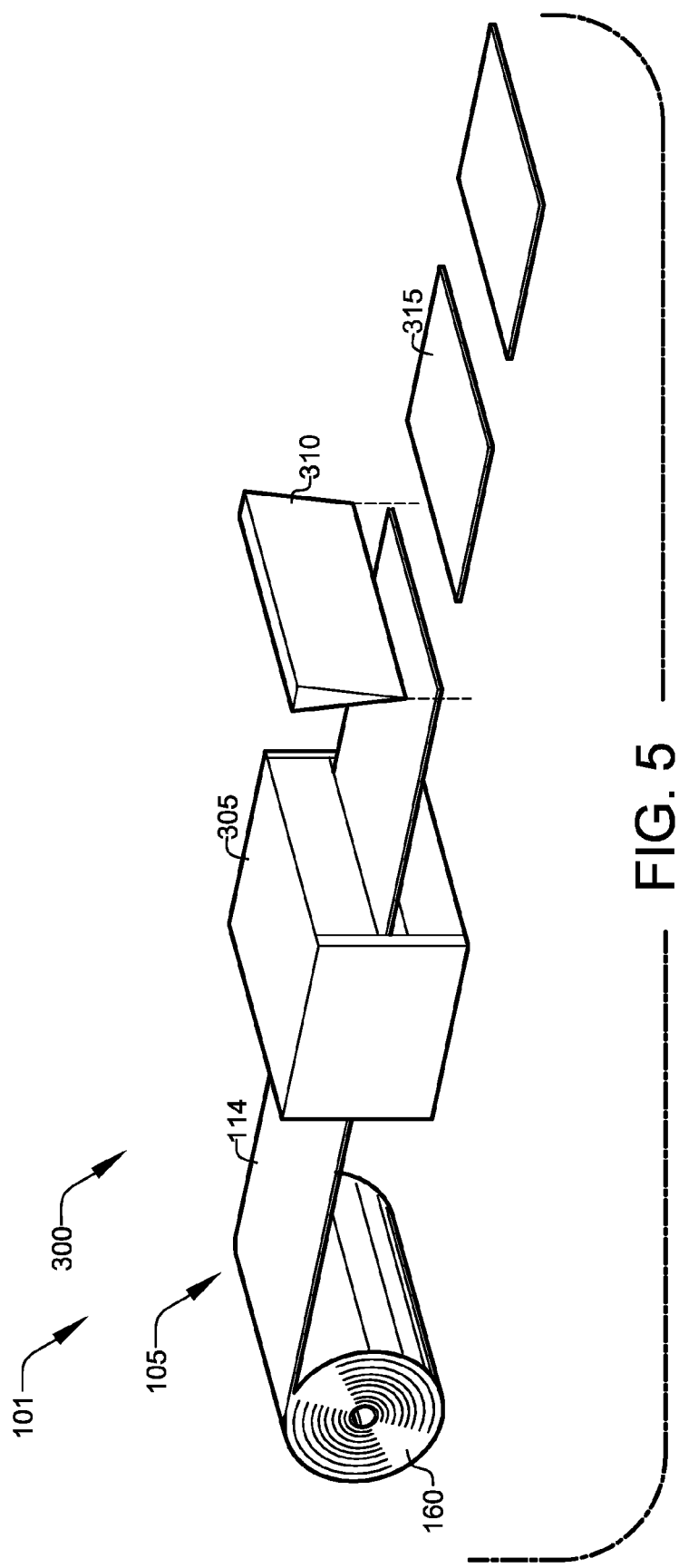
FIG. 5 shows a side perspective view of a post-manufacturing process, illustrating post-manufacturing processing of a continuous roll of adherable material, of an extrudable adherable material system, according to the preferred embodiment of FIG. 1.

FIG. 5 shows a side perspective view of a post-manufacturing process 300, illustrating post-manufacturing processing of continuous roll 160 of adherable material 105, of an extrudable adherable material system 100, according to preferred embodiment 101 of FIG. 1. Continuous roll 160 preferably facilitates continuous printing on printable side 114. At least one printer 305 is preferably capable of accepting continuous roll 160 of adherable material 105 for printing. Printer 305 preferably accepts thick media, preferably between about 20 mils and about 50 mils. Further, printer 305 is preferably capable of printing on printable side 114 of adherable material 105. When printable side 114 of adherable material 105 is manufactured blank, printer 305 preferably prints on printable side 114 (this arrangement at least embodying herein printing such at least one printable side of such at least one "wide-width" continuous layered roll). When printing on adherable material 105, release-sheet layer 130 preferably protects adhesive layer 120 from damage, as well as, preferably prevents adherable material 105 from sticking in printer 305.

Continuous roll 160 preferably also facilitates cutting adherable material 105 into at least one adherable printed display 315 of at least one selectable size appropriate to use of adherable printed display 315. At least one cutter 310 preferably accepts continuous roll 160. Cutter 310 preferably is capable of cutting thick materials, preferably between about 20 mils and about 50 mils thick.

When printable side 114 of adherable material 105 preferably has been printed, alternately preferably is blank, cutter 310 preferably cuts adherable material 105 into at least one selected size appropriate to at least one use of adherable printed display 315 (this arrangement at least embodying herein cutting such at least one "wide-width" continuous layered roll). Such at least one use of adherable printed display 315 (at least embodying herein wherein a plurality of adherable printed displays may be obtained) may be preferably as at least one bumper sticker, alternately preferably as at least one sign, alternately preferably as at least one label. Such at least one selectable size preferably may be appropriate to signs for windows, alternately preferably signs for cars, alternately preferably bumper stickers, alternately preferably large signs. Such at least one selectable sizes preferably range up to at least one dimension of continuous roll 160. Such at least one selectable size preferably is about 9 inches by about 3 inches, alternately preferably about 9 inches by about 18 inches, alternate preferably about 18 inches square, alternately preferably about 18 inches by about 36 inches, alternately preferably about 2 feet square, alternately preferably about 2 feet by about 6 feet. Cutter 310 preferably comprises at least one die cutter. Upon reading this specification, those with skill in the art will now appreciate that, under appropriate circumstances, considering such issues as then cost, advancing technology, newly developed cutting methods, etc., use of other cutters such as, for example, rotary cutters, rotary die cutters, slicers, etc., may suffice.

Figure 6:
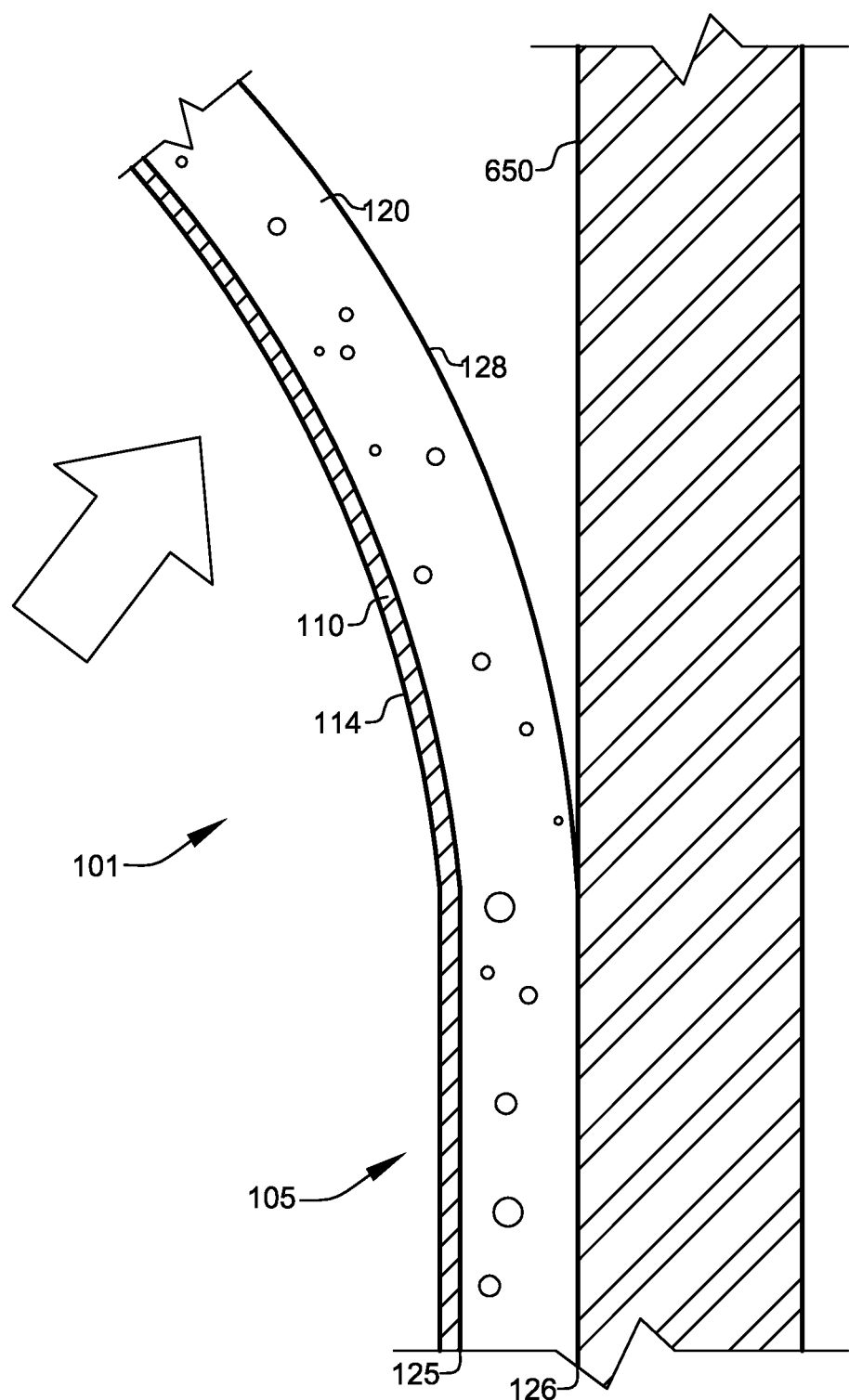
FIG. 6 shows a side view, illustrating an adherable material of an extrudable adherable material system adhering to a surface, according to the preferred embodiment of FIG. 1.

FIG. 6 shows a side view, illustrating an adherable material 105 adhering to at least one surface 650, according to preferred embodiment 101 of FIG. 1. Contact adhesive side 128 preferably may bond to surface 650 forming at least one contact bond 126, as shown. Primary bond 125 is preferably substantially stronger than contact bond 126. Contact bond 126 comprises a weaker bond preferably designed to allow removal of adherable material 105 from surface 650, preferably without breaking primary bond 125.

Adhesive layer 120 preferably causes no damage, when removed, to surface 650. Adhesive layer 120 preferably leaves no residue on surface 650 when adherable material 105 is removed (this arrangement at least embodying herein wherein such at least one second side of such at least one cooled extruded adhesive layer when releasing from such additional surfaces leaves no substantial residue on such additional surfaces). Adhesive layer 120 preferably removes no part of surface 650 when adherable material 105 is removed (this arrangement at least embodying herein wherein such at least one second side of such at least one cooled extruded adhesive layer when releasing from such additional surfaces causes no substantial damage to such additional surfaces).

Contact bond 126 (at least embodying herein wherein such at least one second side of such at least one cooled extruded adhesive layer is capable of forming, releasing from, and re-forming contact bonds with additional surfaces than surfaces comprising release-sheet layers) preferably is re-useable, preferably allowing removal and bonding multiple times. Contact bond 126 preferably sustains adherence despite ordinary forces acting upon adherable material 105 during use. When contact adhesive side 128 becomes soiled, such that contact bond 126 is inadequate to sustain adherence, contact adhesive side 128 preferably may be washed, with soap and water, to remove soil and preferably substantially restore quality of contact bond 126 (this arrangement at least embodying herein wherein such at least one second side of such at least one cooled extruded adhesive layer, when loss of capability of re-forming contact bonds due to soiling occurs, is capable of being restored by cleaning). Adherable material 105 may preferably substitute for sheet magnets either when surface 650 is non-metallic or where a magnetic field is not desirable.

Figure 7:
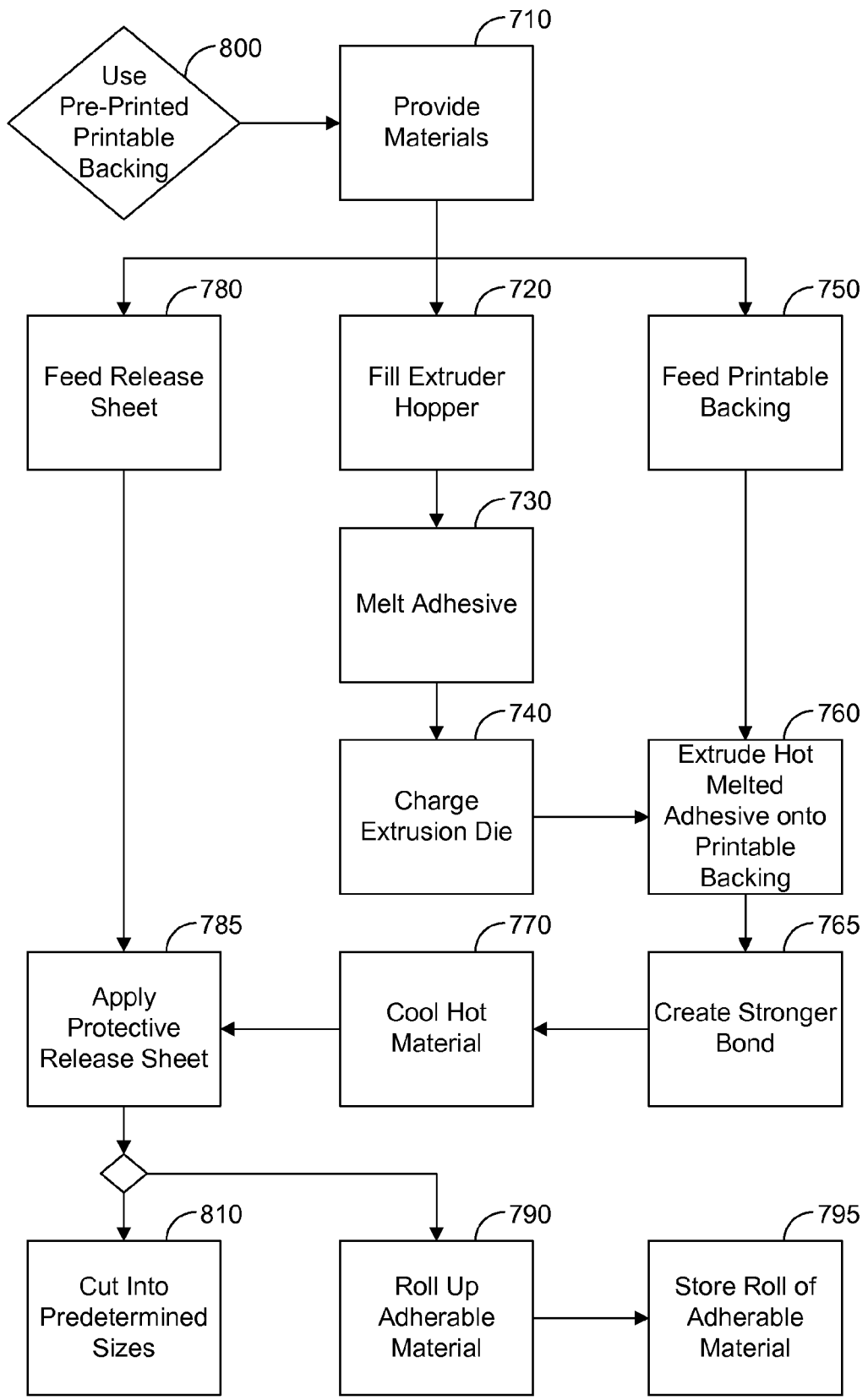
FIG. 7 shows a flow chart illustrating, the manufacturing process of an adherable material, according to the preferred embodiment of FIG. 4.

FIG. 7 shows a flow chart illustrating, manufacturing process 200 of an adherable material 105, according to preferred embodiment 101 of FIG. 4. Printable layer 110 and release-sheet layer 130 are preferably provided in continuous rolls for manufacturing of adherable material 105, as shown, in step Provide Materials 710 (at least embodying herein providing at least one continuous supply of at least one printable material having a "wide width"). Additionally, thermoplastic hot melt adhesive 210 is preferably provided, as shown, in step Provide Materials 710 (at least embodying herein providing at least one meltable supply of at least one thermoplastic adhesive material).

Thermoplastic hot melt adhesive 210 is preferably placed into hopper 224 of extruder 220 in step Fill Extruder Hopper 720, as shown. Thermoplastic hot melt adhesive 210 preferably transfers from hopper 224 to melting chamber 226 and preferably melts, as shown, in step Melt Adhesive 730 (at least embodying herein melting such at least one meltable supply in at least one heated chamber to provide at least one melted supply of such at least one thermoplastic material). Extrusion die 228 preferably charges with hot melted adhesive 215 in step Charge Extrusion Die 740, as shown.

Printable layer 110 preferably unrolls from printable layer continuous roll 212 and preferably feeds under extrusion die 228 in step Feed Printable Backing 750, as shown. Hot melted adhesive 215 preferably extrudes from extrusion die 228 onto printable layer 110, as shown, in Step Extrude Hot Melted Adhesive onto Printable Backing 760 (at least embodying herein continuously hot-extruding such at least one melted supply of such at least one thermoplastic adhesive material onto such at least one first side of such at least one continuous supply of such printable material to provide at least one hot extruded adhesive layer). Heat from hot melted adhesive 215 preferably causes primary bond 125 to form between hot melted adhesive 215 and bondable side 118 of printable layer 110, as shown, in step Create Stronger Bond 765 (at least embodying herein wherein at least one hot contact area, between at least one first side of such at least one hot extruded adhesive layer and such at least one first side of such at least one continuous supply of such printable material, forms at least one "strong" thermoplastic bond).

Hot melted adhesive 215 and printable layer 110 preferably cool on cooler roll 240, as shown, in step Cool Hot Material 770 (at least embodying herein wherein such step of cooling comprises providing at least one cooling roller in contact with such at least one continuous supply of printable material). Adhesive layer 120 forms as hot melted adhesive 215 cools in step Cool Hot Material 770 (at least embodying herein cooling such at least one hot extruded adhesive layer during such at least one continuous process to provide at least one cooled extruded adhesive layer).

Release-sheet layer 130 preferably unrolls from release-sheet layer continuous roll 214 and preferably feeds onto application roller 255 in step Feed Release Sheet 780, as shown. Application roller 255 preferably applies release-sheet layer 130 to contact adhesive side 128 of adhesive layer 120, as shown, in step Apply Protective Release Sheet 785 (at least embodying herein continuously applying at least one continuous release-sheet layer upon at least one second side of such at least one cooled extruded adhesive layer). Take-up roller 260 preferably rolls completed adherable material 105 into continuous roll 160 in step Roll Up Adherable Material 790, as shown. When continuous roll 160 reaches full dimension adherable material 105 is preferably cut and continuous roll 160 is preferably stored for later use in step Store Roll of Adherable Material 795, as shown, completing manufacture of continuous roll 160 in manufacturing process 200 (at least herein embodying wherein at least one "wide-width" continuous layered roll may be manufactured in at least one continuous process).

Alternately, in place of steps Roll Up Adherable Material 790 and Store Roll of Adherable Material 795, adherable material 105 preferably may be cut into at least one selectable size in step Cut into Predetermined Sizes 810, as shown. When providing printable layer continuous roll 212 in step Provide Materials 710, printable layer continuous roll 212 alternately preferably may be pre-printed, as shown, in step Use Pre-Printed Printable Backing 800 (at least embodying herein as a preliminary step, the step of printing such at least one printable side of such at least one continuous supply).

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A roll system, relating to adherable material, comprising:
   at least one printable material, in at least one continuous length;
   at least one layer of thermoplastic adhesive material hot extruded onto said continuous length of said at least one printable material, wherein said at least one thermoplastic adhesive material is homogeneous in composition, said at least one thermoplastic adhesive material layer overlaying and forming at least one contact area with said at least one printable material at least one first side of said at least one thermoplastic adhesive material layer forming at least one strong thermoplastic bond with said at least one printable material, at least one second side of said at least one layer of thermoplastic adhesive material permitting contact adhesion to surfaces, said thermoplastic material layer having a thickness between about 20 mils and about 30 mils wherein said thickness is greater than a thickness of said at least one printable material;
   at least one release-sheet material, in at least one continuous length, overlaying said at least one second side of said at least one thermoplastic adhesive material, and wherein at least one contact area between said at least one release-sheet material, and said at least one second side of said at least one thermoplastic adhesive material forms at least one weak contact bond, wherein contact adhesion is defined by forming, releasing from, and reforming contact bonds with surfaces other than surfaces comprising at least one release-sheet material.

2. The roll system according to claim 1 wherein at least one thermoplastic adhesive material comprises at least one copolymer.

3. The roll system according to claim 2 wherein said at least one copolymer comprises at least one styrene-ethylene/butylene-styrene polymer.

4. The roll system according to claim 3 wherein said at least one styrene-ethylene/butylene-styrene polymer comprises about 34% polystyrene.

5. The roll system according to claim 1 wherein reforming contact bonds of said at least one second side of said at least one thermoplastic adhesive material, when adhesion loss due to soiling occurs, is restored by cleaning of said at least one second side of said at least one thermoplastic adhesive material.

6. The roll system according to claim 1 wherein said at least one second side of said at least one thermoplastic adhesive material when releasing from said surfaces causes no substantial damage to said surfaces.

7. The roll system according to claim 1 wherein said at least one second side of said at least one thermoplastic adhesive material when releasing from said surfaces causes no substantial residue on said surfaces.

8. The roll system according to claim 1 wherein said at least one printable material has a wide-width comprising no less than from about 1 foot to about 3 feet.

9. The roll system according to claim 8 wherein said roll system comprises a length of about 500 feet.

10. The roll system according to claim 2 wherein said at least one printable material comprises polyvinyl.

11. The roll system according to claim 10 wherein at least one thickness of said polyvinyl comprises from about two mils to about three mils.

12. A method of manufacturing a continuous layered roll of printable material, comprising the steps of:
   providing at least one meltable supply of at least one thermoplastic adhesive material;
   melting said at least one meltable supply in at least one heated chamber to provide at least one melted supply of said at least one thermoplastic adhesive material;
   supplying said at least one melted supply to an extrusion die;
   providing at least one continuous supply of at least one printable material, the continuous supply being at least one printable layer continuous roll, at least one first side of said at least one continuous supply of said printable material being capable of forming at least one thermoplastic bond with said at least one thermoplastic adhesive material;
   unrolling and feeding said printable layer continuous roll under said extrusion die;
   continuously hot-extruding said at least one melted supply of said at least one thermoplastic adhesive material from said extrusion die onto said at least one first side of said at least one continuous supply of said printable material to provide at least one hot extruded adhesive layer;
   forming at least one strong thermoplastic bond between said at least one first side of said at least one hot extruded adhesive layer and said at least one first side of at least one continuous supply of said printable material;
   cooling said at least one hot extruded adhesive layer to provide at least one cooled extruded adhesive layer on said at least one first side of said at least one continuous supply of said printable material, said cooled extruded layer providing a weak contact bonding surface, said at least one cooled extruded adhesive layer having a thickness of between about 20 mils and about 30 mils; and
   applying at least one continuous release-sheet layer onto said at least one cooled extruded adhesive layer via pressure application rollers continuously forming a weak contact bond between said at least one continuous release-sheet and said at least one cooled extruded adhesive layer, said cooled extruded adhesive layer permits contact adhesion to surfaces when said at least one continuous release sheet layer is removed from the printable material, said contact adhesion defined by forming, releasing from, and reforming contact bonds with surfaces other than said at least one continuous release sheet liner.

13. The method according to claim 12, wherein at least one continuous layered roll may be manufactured in at least one continuous process and has a wide-width, wherein said wide-width comprises no less than about one foot to about 3 feet.

14. A method of manufacturing a continuous layered roll of printable material, comprising the steps of:
   providing at least one meltable supply of at least one thermoplastic adhesive material;
   melting said at least one meltable supply in at least one heated chamber to provide at least one melted supply of said at least one thermoplastic material;
   supplying said at least one melted supply to an extrusion die;
   providing at least one continuous supply of at least one printable material, the continuous supply being at least one printable layer continuous roll, at least one first side of said at least one continuous supply of said printable material being capable of forming at least one thermoplastic bond with at least one thermoplastic adhesive material;

feeding said printable layer continuous roll in proximity to said extrusion die;

continuously hot-extruding said at least one melted supply of said at least one thermoplastic adhesive material from said extrusion die onto said at least one first side of said at least one continuous supply of said printable material to provide at least one hot extruded adhesive layer;

cooling at least one hot extruded adhesive layer to provide at least one cooled extruded adhesive layer;

providing at least one continuous release-sheet layer onto said at least one cooled extruded adhesive layer;

applying pressure to said at least one cooled extruded adhesive layer located between said printable layer and said at least one continuous release sheet layer forming a weak contact bond between said at least one continuous release-sheet and said at least one cooled extruded adhesive layer, wherein at least one first side of said at least one cooled extruded adhesive layer and said at least one first side of said at least one continuous supply of said printable material forms a strong thermoplastic bond therebetween.

* * * * *